May 27, 1930.  M. M. TAYLOR  1,760,450
ARM REST
Filed Aug. 2, 1928
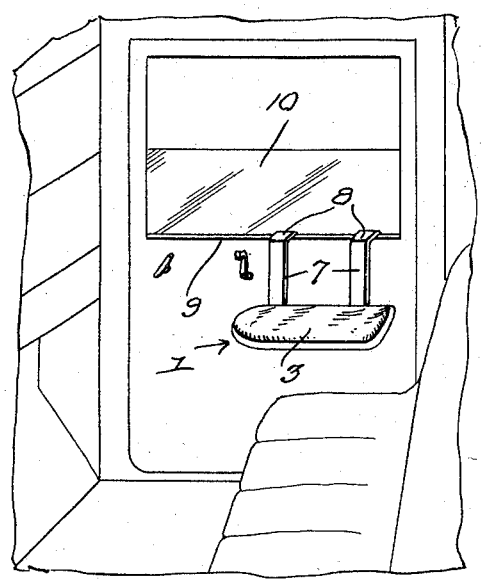
Fig. 1.
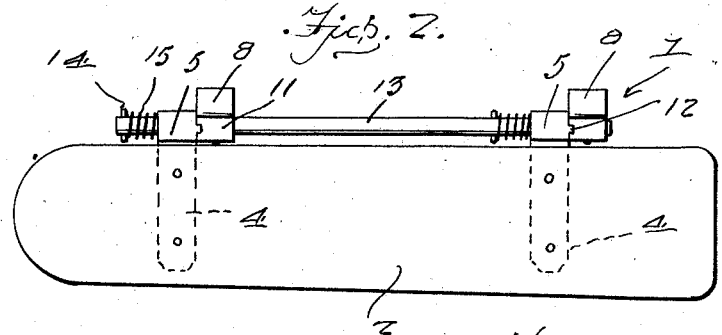
Fig. 2.
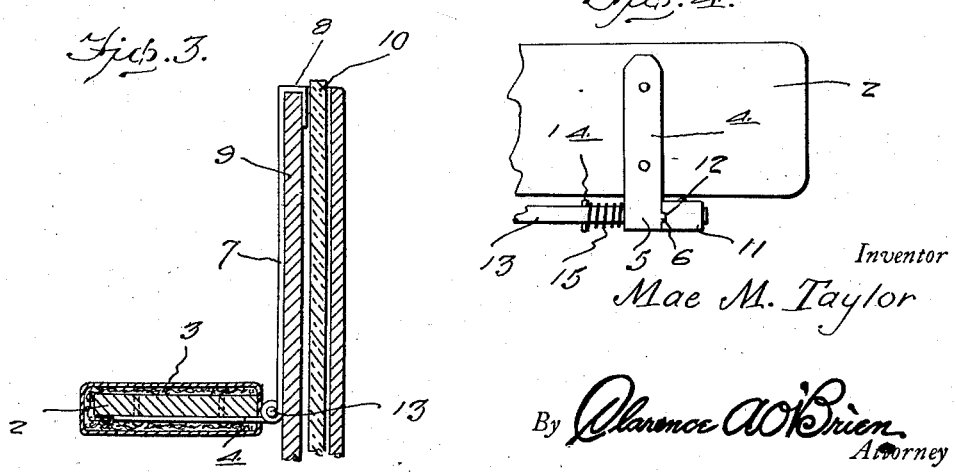
Inventor
Mae M. Taylor
By Clarence A. O'Brien
Attorney Patented May 27, 1930

1,760,450

UNITED STATES PATENT OFFICE

MAE M. TAYLOR, OF HOLLYWOOD, CALIFORNIA

ARMREST

Application filed August 2, 1928. Serial No. 297,042.

The present invention relates to improvements in arm rests and has reference more particularly to a device that is primarily for use beside the seat of an automobile.

One of the important objects of the present invention is to provide an arm rest for automobiles which is available with special utility as a side arm, for the seats of automobiles of the sedan or coach type, and which can be equally as well used as desired for a like purpose with other types of automobiles.

A further object is to provide an arm rest that will provide a comfortable support for the arm, but which, when not in use, can be easily caused to fold or swing out of the way.

Still a further object is to provide an arm rest for automobiles which is located below the sill of the window at the proper height to support the arm comfortably, and which is so mounted as to present a neat appearance at all times.

Still a further object is to provide an arm rest for automobiles which includes a means for maintaining the vertically swinging board in a horizontal operative position.

Still a further object is to provide an arm rest for automobiles of the above mentioned character that can be readily and easily applied and detached, and does not necessitate the alterations of any parts of the vehicle with which the arm rest is associated, the same being simple in construction, inexpensive, strong and durable and further well adapted to the purpose for which it is designed.

Other objects of the invention will become apparent as the nature of the invention proceeds and when taken in connection with the accompanying drawings.

In the accompanying drawings:

Figure 1 is a perspective view of the arm rest embodying my invention, showing the manner in which the same is attached to one of the doors of an automobile showing the board in a horizontal operative position.

Figure 2 is a top plan view of the device, with the board in an operative horizontal position.

Figure 3 is a vertical sectional view through the board, showing the manner in which the same is attached to one of the doors of the automobile, and Figure 4 is a fragmentary bottom plan view of one end portion of the board and the supporting means therefor.

In the drawing, wherein for the purpose of illustration is shown the preferred embodiment of my invention, the numeral 1 designates generally my improved arm rest, the same comprising the arm supporting board 2 that may be covered with suitable upholstery such as is shown at 3, in Figure 3. Attached to the bottom of the board 2, inwardly of the respective ends thereof are the transversely disposed metallic straps 4.

The outer ends of these metallic straps extend beyond the inner longitudinal edge of the board 2 and the outwardly projecting ends of these straps are bent to form the alined sleeves 5. Each of these sleeves is formed at one end with the outwardly projecting lugs 6, that are disposed at diametrically opposite points with respect to each other, and the purpose of these lugs will be presently described.

The invention further comprehends the provision of a pair of suspension arms denoted by the reference character 7 and which suspension arms are also formed of metal, the upper ends of these arms being bent to form downwardly disposed hooks 8, that detachably engage over the adjacent wall part 9 of the automobile door, and in such a manner as not to interfere with the raising and lowering of the window glass 10, and yet provide a snug fit, so that the device will not rattle or slip incident to the vibration of the automobile, while the latter is in operation.

The lower end of each supporting arm 9 is bent to form a horizontally disposed sleeve 11 for disposition adjacent the respective sleeves formed on the outer ends of the strap iron members 4.

The ends of the sleeves 11 adjacent the respective sleeves 5 are formed with diametrically opposed notches 12 for receiving the respective lugs 6 as suggested very clearly in Figures 2 and 4 of the drawings.

An elongated rod 13 extends through the aligned sleeves 5 and 11, and suitable securing means extend through the sleeves 11 for maintaining the rod 13 stationary, and one end of the rod or shaft 13 projects beyond the forward sleeve 5.

Suitable pins 14 extend transversely through the rod 13, in spaced relation to the sleeves 5 and encircling the rod or shaft 13 are the normally expanded coil springs 15, a pair of such coil springs being provided. One end of each coil spring engages with the respective pin 14, while the other end engages with the adjacent end of the respective sleeve 5, for normally urging the lugs 6, into engagement with the notches 12, whereby the arm rest board 2, will be supported in a horizontal operative position as indicated in the drawing. However, when it is desired not to use the arm rest, the board 2 is grasped and is moved forwardly so that the sleeves 5 will be caused to slide along on the rod 13, against the tension of the springs 15, whereby to disengage the lugs 6 from the respective notches 12 and when this action has taken place, the board 2 may then be either swung upwardly or downwardly against the inner wall 9 of the automobile door in an out-of-the-way position, and secured in said position by cooperation of the lugs and certain of the notches before referred to.

It will thus be seen from the foregoing description that I have provided an automobile arm rest that can be readily and easily attached or removed, and will, at all times, be positive and efficient in carrying out the purposes for which it is designed. Furthermore, due to its simplicity, the board on which the arm is adapted to rest may be quickly swung to a raised operative position.

While I have shown the preferred embodiment of my invention, it is to be understood that various changes in the size, shape and arrangement of parts may be resorted to, without departing from the spirit of the invention or the scope of the appended claim.

I claim:

An arm rest for automobiles consisting essentially of suspension arms having hooks at their upper ends and horizontally disposed aligned sleeves at their lower ends and also having diametrically opposite notches in the forward end of each sleeve, a rod fixed in said sleeves, and extending forwardly beyond the forward sleeve and having pins spaced forwardly of the sleeves, a board, metallic straps fixed to the underside of the board and having sleeves mounted on and movable about and also movable lengthwise of said rod and provided at their rear ends with diametrically opposite lugs for cooperation with the notches in the first-named sleeve, and coiled springs mounted on the rod and interposed between the pins thereof and the second-named sleeve.

In testimony whereof I affix my signature.

MAE M. TAYLOR.